United States Patent Office 3,260,760
Patented July 12, 1966

3,260,760
STABILIZED CHLORINATED HYDROCARBON COMPOSITIONS

Charles Domen and André Ryckaert, Brussels, Belgium, and Charles Jegge, Zurzach, Aargau, Switzerland, assignors to Solvay & Cie, Brussels, Belgium, a Belgian company No Drawing. Filed Oct. 8, 1963, Ser. No. 314,650
Claims priority, application Belgium, Oct. 31, 1962, 628,330
6 Claims. (Cl. 260—652.5)

The present invention comprises a process for the stabilization of chorinated hydrocarbons, particularly trichloroethylene and perchloroethylene, with a view to avoiding the decomposition of these products and the simultaneous formation of oxidation products during storage or during their use.

It is known that, under the influence of heat and oxygen, chlorinated hydrocarbons undergo an oxidation which is catalyzed by different agents such as light and certain metallic salts, in particular the salts of iron, aluminum and magnesium.

To retard this oxidation it has been proposed to add to the chlorinated hydrocarbons small amounts of various products such as alcohols, inorganic or organic basic products, phenols, epoxide compounds etc.

Recourse has likewise been taken to the addition of two or more stabilizers which exert a synergistic action. Thus, in a previous patent of the applicants (Belgian patent specification No. 562,288) it has been shown that the simultaneous addition of phenol and of the epoxide compound gives results superior to the sum of the stabilization action of the two components; nevertheless, this action has only been confirmed when hydroxy-benzene is used as a phenolic compound and not in the case where higher phenols are used such as cresols or thymol.

The applicants have now found that a synergistic action can be obtained which extends equally to other phenolic compounds, by selecting a co-reactive epoxide compound from those carrying in the molecule at least one further function containing oxygen. This other function containing oxygen may be an alcoholic function, or an ester or ether for example, it may consist of a second epoxide group. In the synergistic mixture according to the invention, those in which the phenol is selected from orthodiphenol (or catechol) and its substitution derivatives, such as p-tert-butylcatechol and p-methylcatechol give good results even with small amounts of the phenolic compound.

The stabilization action of the various compounds and systems of compounds used to improve the resistance of chlorinated hydrocarbons to decomposition is shown by the accelerated laboratory test carried out as follows;

150 cubic centimetres of trichloroethylene, for example, and a test piece of aluminum are placed in a 300 cubic centimetres flask and a Soxhlet extraction apparatus provided with an extractor of 65 cubic centimeters. The flask is electrically heated and the trichloroethylene is rapidly brought to boiling under reflux at a constant rate while the apparatus is traversed by a current of oxygen and illuminated by a fluorescent lamp of the "blue actnic" type. During the time of the test, the rate of release of the acid vapours leaving the apparatus is measured. This rate, very small at first, becomes suddenly very large while the trichloroethylene darkens in color and transforms into a black tarry mass. The resistance of the trichloroethylene under test is measured by the time, expressed in hours counted from the start of the experiment when the sample reaches boiling point until the time when the release of the acid abruptly becomes very rapid and exceeds $15.10^{-3}$ gram moles per hour.

The following table shows resistance to decomposition of unstabilized trichloroethylene and trichloroethylene stabilized with various phenolic and/or epoxide compounds.

| | No epoxide compound | Epichlorohydrin, 1,500 mgr./l. | 1.2-Epoxybutane, 1,500 mgr./l. | 2.3-Epoxybutane, 1,500 mgr./l. | Glycidol, 1,500 mgr./l. | 1.2-Epoxy-3-cyclopentanol, 1,500 mgr./l. | Glycidyl acetate, 1,500 mgr./l. | 1.2-Epoxy-3-methoxypropane 1,500 mgr./l. | 1.2-Epoxy-3-ethoxypropane 1,500 mgr./l. | Allyl-Glycidyl ether 1,500 mgr./l. | 1.2.3.4-Diepoxybutane 1,500 mgr./l. |
|---|---|---|---|---|---|---|---|---|---|---|---|
| No phenol | 22 | 87 | 30 | 66 | 42 | 25 | 38 | 42 | 28 | 37 | 41 |
| Phenol, 200 mgr./l | 95 | 294 | ------ | ------ | 379 | 282 | ------ | 260 | ------ | ------ | 307 |
| o-Cresol, 200 mgr./l | 130 | 218 | ------ | ------ | 502 | 455 | 293 | ------ | ------ | ------ | 328 |
| m-Cresol, 200 mgr./l | 77 | ------ | ------ | ------ | 367 | ------ | ------ | ------ | ------ | ------ | ------ |
| p-Cresol, 200 mgr./l | 124 | 164 | ------ | ------ | 467 | 353 | 209 | 303 | 366 | ------ | ------ |
| Thymol: | | | | | | | | | | | |
| 100 mgr./l | 35 | 82 | ------ | ------ | ------ | ------ | ------ | ------ | ------ | ------ | ------ |
| 200 mgr./l | 45 | ------ | ------ | ------ | 105 | ------ | 136 | ------ | ------ | ------ | ------ |
| Catechol, 25 mgr./l | 36 | ------ | 48 | ------ | | ------ | ------ | ------ | ------ | ------ | 187 |
| Catechol, 50 mgr./l | 186 | 157 | ------ | 93 | 314 | ------ | ------ | ------ | ------ | ------ | ------ |
| p-tert.-butylcatechol, 50 mgr./l | 45 | 66 | 50 | 68 | ------ | ------ | ------ | ------ | ------ | 124 | ------ |

The results of these experiments show in the last seven columns, the synergistic effect realized by the use of a mixture formed on the one hand by an epoxide compound having another function containing oxygen and on the other hand of a phenolic compound which can be phenol, one of its higher homologues or a diphenol. Columns 2, 3 and 4 of the table enable one to see that, with the exception of hydroxy-benzene, no synergistic effect exists between phenols and epoxide compounds which carry no other function containing oxygen. The application of the process according to the invention thus leads to new results.

The quantities of stabilizing materials to be applied are in general comprised between 0.05 and 0.5 gram per litre for the monophenolic compound and from 0.5 to 10 grams per litre for the epoxide compound having one or more other functions containing oxygen. The proportions which appear to be most advantageous are from 0.1 to 0.2 gram for the monophenols and 1.5 to 5 grams for the epoxides, per litre of chlorinated hydrocarbon to be stabilised.

When a diphenol is used as phenolic compound, the amount of it to be applied can be brought down between 0.01 and 0.5 gram per litre. It can be seen from the table that amounts of catechol as low as 25 milligrams per litre already permit good stability to be obtained, due to the mutual synergistic action of the two constituents and not to the action of the diphenol alone (for example, catechol 25 milligrams per litre and 1,2-epoxybutane 1500 milligrams per litre).

If desired, other known compounds can be added to the combination stabilizing substances which forms the object of the invention, in particular inorganic or organic substances having an alkaline reaction which modify the initial pH of the chlorinated hydrocarbon.

The stabilizing compositions according to the invention are particularly effective in the case of the stabilization of trichloroethylene. They can however, without departing from the scope of the invention, be used for the stabilization of perchloroethylene and other chlorinated hydrocarbons such as chloromethanes, dichloroethanes, trichloroethanes, dichloroethylenes, allyl chloride, chloropropanes, chloropropenes, etc., and their mixtures.

The applicants are aware that the use of pyrocatechol and other diphenols, taken separately, for the stabilization of low molecular weight chlorinated hydrocarbons, has already been described (German patent specification No. 573,105, U.S. patent specification No. 2,008,680).

We claim:

1. A stabilized chlorinated hydrocarbon containing a stabilizing amount of a mixture of a phenolic compound selected from the group consisting of lower-alkyl phenol, catechol, and lower-alkyl catechol and an epoxide selected from the group consisting of glycidol, 1,2-epoxy-3-cyclopentanol, glycidyl acetate, 1,2-epoxy-3-methoxypropane, 1,2-epoxy-3-ethoxypropane, allyl-glycidyl ether, 1,2,3,4-diepoxybutane.

2. A stabilized chlorinated hydrocarbon according to claim 1 wherein said phenolic compound is p-tert-butylcatechol.

3. Stabilized trichloroethylene containing a stabilizing amount of a mixture of a phenolic compound selected from the group consisting of lower-alkyl phenol, catechol, and lower-alkyl catechol and an epoxide which is selected from the group consisting of glycidol, 1,2-epoxy-3-cyclopentanol, glycidyl acetate, 1,2-epoxy-3-methoxypropane, 1,2-epoxy-3-ethoxypropane, allyl-glycidyl ether, 1,2,3,4-diepoxybutane.

4. A stabilized chlorinated hydrocarbon containing per litre of said chlorinated hydrocarbon, a mixture of about 0.05 gram to 0.5 gram of lower-alkyl phenol and about 0.5 gram to 10 grams of an epoxide which is selected from the group consisting of glycidol, 1,2-epoxy-3-cyclopentanol, glycidyl acetate, 1,2-epoxy-3-methoxypropane, 1,2-epoxy-3-ethoxypropane, allyl-glycidyl ether, 1,2,3,4-diepoxybutane.

5. A stabilized chlorinated hydrocarbon, containing per litre of said chlorinated hydrocarbon a mixture of about 0.01 gram to 0.5 gram of catechol and about 0.5 gram to 10 grams of an epoxide selected from the group consisting of glycidol, 1,2-epoxy-3-cyclopentanol, glycidyl acetate, 1,2-epoxy-3-methoxypropane, 1,2-epoxy-3-ethoxypropane, allyl-glycidyl ether, 1,2,3,4-diepoxybutane.

6. A stabilized chlorinated hydrocarbon containing per litre of said chlorinated hydrocarbon a mixture of about 0.01 gram to 0.5 gram of lower-alkyl catechol and about 0.5 gram to 10 grams of an epoxide which is selected from the group consisting of glycidol, 1,2-epoxy-3-cyclopentanol, glycidyl acetate, 1,2-epoxy-3-methoxypropane, 1,2-epoxy-3-ethoxypropane, allyl-glycidyl ether, 1,2,3,4-diepoxybutane.

References Cited by the Examiner

UNITED STATES PATENTS

| | | | |
|---|---|---|---|
| 2,564,194 | 8/1951 | De Nie et al. | 260—652.5 X |
| 2,585,506 | 2/1952 | Shokal et al. | 260—652.5 |
| 2,906,782 | 9/1959 | Ferri et al. | 260—652.5 |
| 2,935,537 | 5/1960 | Daras | 260—652.5 |
| 2,947,792 | 8/1960 | Skeeters | 260—652.5 |
| 2,981,760 | 4/1961 | Ferri et al. | 260—652.5 |

LEON ZITVER, *Primary Examiner.*

DANIEL D. HORWITZ, *Examiner.*

M. M. JACOB, *Assistant Examiner.*